United States Patent [19]

Kato

[11] 4,147,633

[45] Apr. 3, 1979

[54] STACKED FILTERING PLATES

[75] Inventor: Yoshiharu Kato, Tokyo, Japan

[73] Assignee: Ltd. Tesika, Tokyo, Japan

[21] Appl. No.: 803,982

[22] Filed: Jun. 6, 1977

[51] Int. Cl.² ........................................... B01D 29/42
[52] U.S. Cl. ................................... 210/232; 210/413;
210/488
[58] Field of Search ............... 210/488, 492, 232, 413,
210/414, 415

[56] References Cited

U.S. PATENT DOCUMENTS

| 3,516,542 | 6/1970 | Jaume | 210/492 X |
| 3,568,842 | 3/1971 | Bozek | 210/488 X |

FOREIGN PATENT DOCUMENTS 2144064  2/1973  France ..................................... 210/488

Primary Examiner—Frank A. Spear, Jr.
Attorney, Agent, or Firm—Oblon, Fisher, Spivak, McClelland & Maier

[57] ABSTRACT

A plurality of filtering plates stacked up one on top of another to form a filter in conjunction with clamping bolts passed through the filtering plates and scrapers interposed between said filtering plates, which stacked filtering plates are characterized in that they are given an increased wall thickness around the perforations bored therein for passage of the clamping bolts, engaging projections are formed on one surface of the portions of increased wall thickness and corresponding engaging recesses are formed on the other surface of the portions so that the engaging projections of the filtering plates will snugly fit into the engaging recesses of the adjacent filtering plates while, at the same time, the portions of the two adjacent filtering plates having normal thickness give rise to filtering spaces therebetween.

3 Claims, 5 Drawing Figures

U.S. Patent   Apr. 3, 1979   Sheet 1 of 3   4,147,633
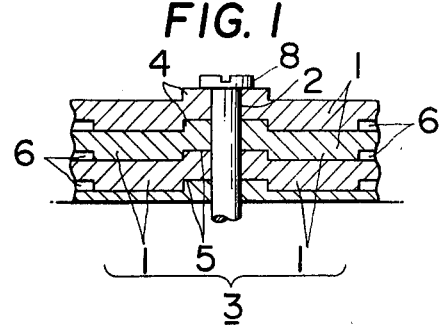
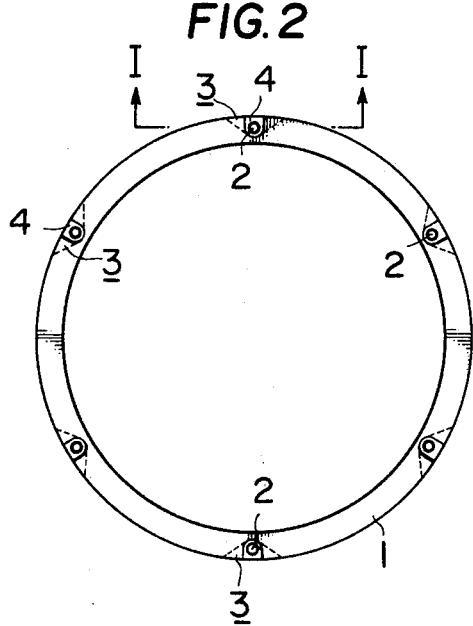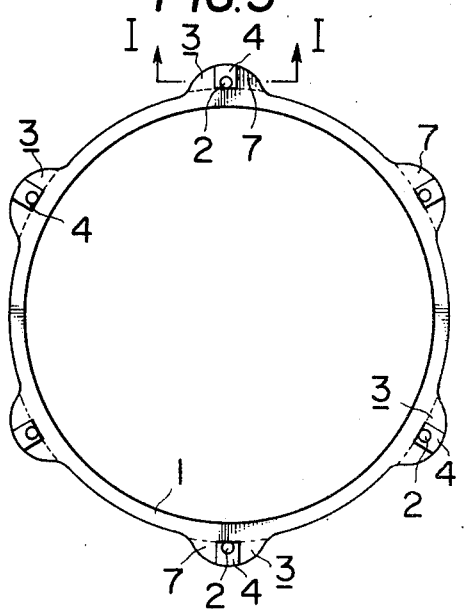

STACKED FILTERING PLATES

BACKGROUND OF THE INVENTION

1. Field of the Invention

This invention relates to improvements in and concerning a plurality of filtering plates for use in a filter which includes a plurality of filtering plates stacked up one on top of another at prescribed fixed intervals for filtering fouled water and scrapers disposed in the gaps intervening between the filtering plates for intimate sliding contact with the opposed surfaces of the adjacent filtering plates, whereby fouling particles adhering to the intervening gaps between the filtering plates will be removed by rotating either the filtering plates or the scrapers.

2. Description of the Prior Art

Conventional filtering plates have had flat upper and lower surfaces and, in order for them to permit intervention of filtering spaces therebetween, they have necessitated interposition of spacers therebetween. (Refer for example to Japanese Utility Model Registrations No. 961,449 and No. 961,450). With the filtering plates of such a construction, however, when the filter incorporating these filtering plates is rotated and the intervening scrapers consequently rub against the spacers, the spacers are made to slip in the rotating direction of the filtering plates owing to the pressure exerted by the scrapers. Consequently, shearing force is exerted to bear upon the clamping bolts inserted through the spacers, with the result that shearing force develops within the clamping bolts, possibly to the extent of deforming the bolts. This phenomenon has constituted a serious disadvantage of conventional filtering plates.

SUMMARY OF THE INVENTION

The object of the present invention is to prevent possible development of shearing force in the clamping bolts, improve the durability of the clamping bolts, prevent the filtering plates from excessive adhesion of fouling particles, enhance the filtering capacity of the filter and lengthen the service life of the filter by giving the filtering plates an increased wall thickness around the perforations bored therein for passage of clamping bolts, forming engaging projections on one surface of the portions of increased wall thickness and corresponding engaging recesses on the other surface of the portions whereby the engaging projections of the filtering plates will fit snugly into and be disposed within the engaging recesses of the adjacent filtering plates while, at the same time, the portions of the two adjacent filtering plates having normal thickness give rise to filtering spaces therebetween.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is an enlarged cross-sectional view taken along the line I—I in the drawing of FIG. 2 and FIG. 3.

FIG. 2 is a plan view of one preferred embodiment of the present invention.

FIG. 3 is a plan view of another preferred embodiment of the present invention.

DETAILED DESCRIPTION OF THE PREFERRED EMBODIMENTS

Figure 4:
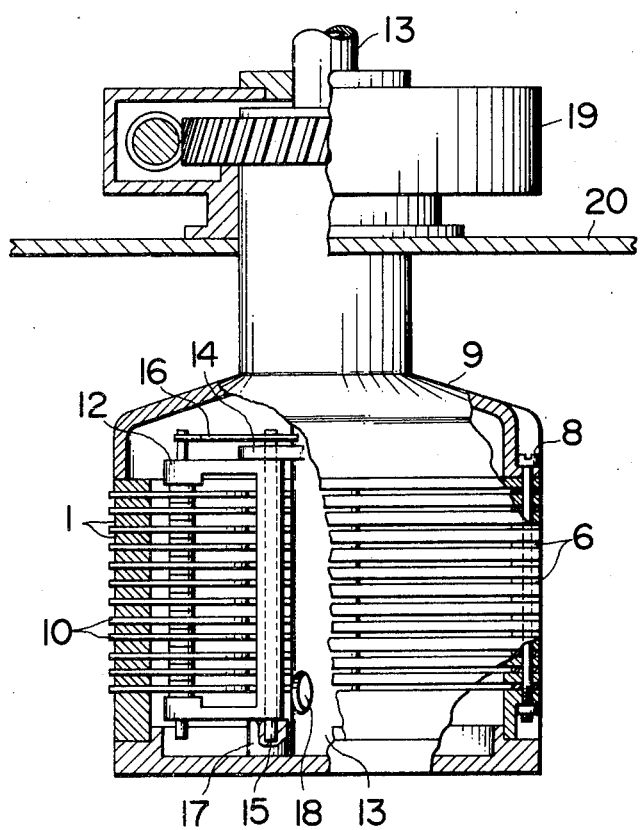
FIG. 4 is a partially cut-away front view of a rotary filter using a plurality of filtering plates of the preferred embodiment of FIG. 2.

The present invention will be described with reference to the drawings illustrating preferred embodiments of the invention. In FIGS. 1 and 2, reference numeral 1 denotes each of a number of thin annular filtering plates having circular inner and outer boundaries. The filtering plates are given an increased wall thickness around the perforations 2 bored therein for passage of clamping bolts, with engaging projections 4 formed on the upper surface of the portions 3 of increased wall thickness and engaging recesses 5 formed on the lower surface of said portions 3 at positions corresponding to those of the engaging projections 4 so that, when the filtering plates 1 are stacked up one on top of another, the engaging projections 4 of the filtering plates 1 fit snugly into and are disposed within the engaging recesses 5 of the adjacent filtering plates 1 and, at the same time, the portions of the adjacent filtering plates 1 having normal thickness give rise to filtering spaces 6 therebetween. The portions 3 of increased wall thickness may be formed in protruding portions 7 where the filtering plates 1 have protruding portions 7 formed on the outer boundaries thereof as illustrated in FIGS. 1 and 3.

Figure 5:
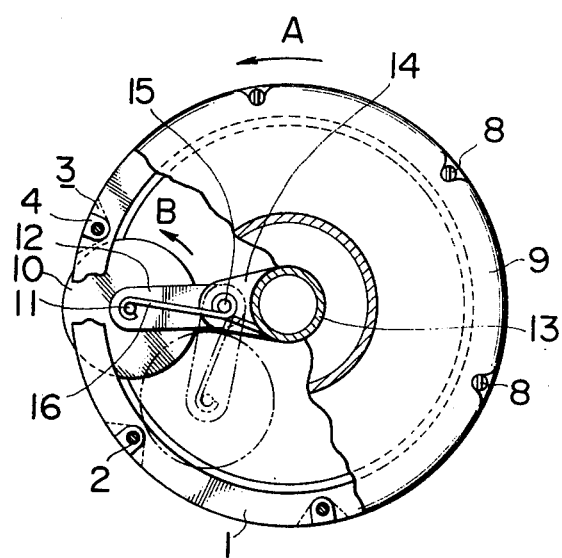
FIG. 5 is a partially cut-away plan view of FIG. 4.

By reference numeral 8 are denoted clamping bolts serving to fasten the filtering plates 1 to the filter proper 9. Denoted by reference numeral 10 are scrapers of the shape of disks which are inserted and slidably held in the filtering spaces to be formed between the filtering plates 1. The scrapers 10 are pivotally fastened with fixing shafts 11 so as to enjoy freedom of rotation. Denoted by reference numeral 12 is a swing element which is fastened with a supporting shaft 15 to an interlocking device 14 attached immovably to a suction pipe 13 and which is adapted so as to be swung within a fixed range as indicated by the lines consisting of alternate long and short dashes in FIG. 5 by means of a spring 16 fastened between a supporting shaft 15 and a fixing shaft 11. By virtue of this swing element, the scrapers 10 are caused to produce a sliding motion within a limited area in the filtering spaces 6.

Denoted by reference numeral 17 is a bearing for supporting the load of said supporting shaft 15, by reference numeral 18 a suction inlet opening into the lower end of the suction pipe 13 and by reference numeral 19 a housing for a worm gear attached to the upper surface of the upper shell of a tank.

When the filter proper 9 is rotated in the direction of the arrow A, the scrapers 10 inserted in the filtering spaces 6 are revolved in the direction of the arrow B while keeping in rubbing contact with the filtering plates 1, with the result that fouling particles deposited in the filtering spaces 6 in the course of the filtering operation will be removed and discharged out of the filter. As the filter proper 9 continues its rotation further, the scrapers 10 approach and finally collide into the engaging projections 4 at the portions of the filtering plates 1 having normal thickness. The contact with the engaging projections 4 causes the scrapers 10 to be pushed toward the interior of the filtering plates 1 with the supporting shaft 15 functioning as the fulcrum and to be revolved in the direction of the arrow B and, at the same time, rotated in the direction of the arrow A until they reach the apexes of the engaging projections 4 (as indicated by the long and short dash line in FIG. 5).

As the filter proper 9 further continues its rotation and the scrapers 10 move past the apexes of the engaging projections 4, the scrapers 10 are energized by the spring 16 to the extent as to overcome the rotating force of the filtering plates 1 and, therefore, are caused to revolve along the engaging projections 4 in the direction of the arrow B while rotating in the direction of the arrow A until their original positions are resumed. In the series of the motions described above, the scrapers 10 are strongly pressed against the engaging projections 4 of the filtering plates 1 by the energizing force of the spring 16 until they reach the apexes of the engaging projections 4. When they move past the apexes of the engaging projections 4, they are strongly pushed outwardly by the spring 16. Consequently, the scrapers 10 are capable of scraping the fouling particles adhering to the engaging projections 4 and removing those deposited in the filtering spaces 6 at the same time.

Since the scrapers repeat this motion each time they come into contact with the engaging projections 4, the fouling particles deposited throughout the entire filtering spaces 6 are completely discharged out of the filter proper 9. Only the clear water resulting from the filtering treatment is allowed to remain inside the filter proper.

During the series of the motions described above, since the adjacent filtering plates are fastened securely through safe engagement between the engaging projections and the corresponding engaging recesses formed in the portions of increased wall thickness of the filtering plates 1, the portions of increased wall thickness which serve to space the plurality of filtering plates and therefore give rise to the filtering spaces therebetween and are not caused to slip even when the filtering plates are rotated. Because of the absence of such slip, no shearing force is brought to bear upon the clamping bolts 8 which are inserted through the perforations 2 bored in the filtering plates 1 for passage of the bolts. This invention has been described with respect to an embodiment wherein the filter proper is rotated. It goes without saying, however, that the filtering plates are also usable effectively in an embodiment wherein the scrapers 10 are revolved.

According to the present invention, the clamping bolts which are used for keeping the plurality of filtering plates in a securely stacked state are prevented from otherwise possible development of shearing force because the filtering plates are given an increased wall thickness around the perforations bored therein for passage of the clamping bolts, engaging projections are formed on one surface of the portions of increased wall thickness and corresponding engaging recesses formed on the other surface of the portions so that the engaing projections of the filtering plates will snugly fit into and be disposed within the engaging recesses of the adjacent filtering plates while, at the same time, the portions of the adjacent filtering plates having normal thickness give rise to filtering spaces therebetween.

If the clamping bolts should be deformed because of shearing force, then fouling particles would excessively be deposited on the adjoining areas of the spacers near the deformed bolts. The effect achieved by this invention in the improvement of the durability of these bolts, therefore, contributes to preventing the filtering plates from excessive adhesion of fouling particles and to improving and maintaining the filtering capacity of the filter proper. Further, the improved durability of clamping bolts has an effect of decreasing the absolute volume of maintenance work to be performed on the filter due to breakage of bolts.

Moreover, since the filtering plates and the spacers are formed integrally, need is no longer found for the task of inserting spacers between the adjacent plates which requires a great deal of time and skill. The omission of such complicated work is beneficial to the operation of filter assembly and contributes to reduction of the cost.

If the portions of increased wall thickness are to be formed completely inside the outer boundaries of the filtering plates which have circular inner and outer boundaries, then the scrapers and the filtering plates are engaged intimately with each other so perfectly that the fouling particles deposited in the filtering spaces are safely and efficiently discharged. Since the outer boundaries of the filtering plates have no projecting portions, the rotation of the filtering plates produces no eddy but gives perfect filtering. If the portions of increased wall thickness are formed outside the outer boundaries of the filtering plates, then the filtering plates have an outer shape similar to that of the conventional filtering plates and therefore, can be used in the same filter proper as that of the conventional countertype. Practical utility of the filtering plates of this invention is usually high.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A filter which comprises:
    a plurality of filtering plates stacked up one on top of another at fixed intervals including peripheral edges with perforations provided therein;
    clamping bolts disposed within said perforations of said peripheral edges of said filtering plates; and,
    scrapers disposed substantially within said filtering plates and within said fixed intervals wherein said filtering plates are provided with an increased wall thickness on one surface thereof around said perforations, engaging projections are provided on one surface of the portions of increased wall thickness and the other surface of said filtering plates include corresponding engaging recesses such that when said filtering plates are stacked up one on top of another said engaging projections of the filtering plates are disposed within said engaging recesses of adjacent filtering plates while, at the same time, the portions of the adjacent filtering plates having normal thickness form filtering spaces therebetween.

2. The filter according to claim 1, wherein the increased wall thickness is formed completely inside the outer boundaries of said filtering plates and have circular inner and outer boundaries.

3. The filter according to claim 1, wherein the increased wall thickness is formed in sections protruding from the outer boundaries of the filtering plates.

* * * * *